United States Patent
Jang

(10) Patent No.: US 9,522,673 B2
(45) Date of Patent: Dec. 20, 2016

(54) TRANSMISSION CONTROL APPARATUS FOR BELT TYPE MILD HYBRID VEHICLE AND TRANSMISSION CONTROL METHOD USING THE SAME

(71) Applicant: MANDO CORPORATION, Pyeongtaek-si, Gyeonggi-do (KR)

(72) Inventor: In Gyu Jang, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 109 days.

(21) Appl. No.: 14/307,023

(22) Filed: Jun. 17, 2014

(65) Prior Publication Data

US 2015/0149008 A1   May 28, 2015

(30) Foreign Application Priority Data

Nov. 22, 2013  (KR) .......................... 10-2013-0142963

(51) Int. Cl.
  *B60W 20/30* (2016.01)
  *B60W 20/00* (2016.01)
  *B60W 10/08* (2006.01)
  *B60W 10/107* (2012.01)

(52) U.S. Cl.
  CPC .............. *B60W 20/30* (2013.01); *B60W 10/08* (2013.01); *B60W 10/107* (2013.01)

(58) Field of Classification Search
  CPC ...... B60W 20/30; B60W 10/107; B60W 10/08
  See application file for complete search history.

(56) References Cited

U.S. PATENT DOCUMENTS

2013/0096758 A1*  4/2013  Yuille .................. B60W 10/06
                                                      701/22

FOREIGN PATENT DOCUMENTS

KR              100736685 B1       7/2007

* cited by examiner

*Primary Examiner* — John Q Nguyen
*Assistant Examiner* — Michael Kerrigan
(74) *Attorney, Agent, or Firm* — Hauptman Ham, LLP

(57) ABSTRACT

A transmission control method for a belt type mild hybrid vehicle includes collecting, by an integrated control unit, shifting information, setting, by the integrated control unit, a target torque of a motor generator in accordance with the shifting information, and controlling, by a motor control unit, the motor generator. In addition, a transmission control apparatus for a belt type mild hybrid vehicle which performs the transmission control method includes a motor generator that is interworked with an engine and a belt, an integrated control unit that collects shifting information and sets a target torque of the motor generator in accordance with the shifting information, and a motor control unit that controls the motor generator in accordance with the target torque set by the integrated control unit.

9 Claims, 3 Drawing Sheets

TRANSMISSION CONTROL APPARATUS FOR BELT TYPE MILD HYBRID VEHICLE AND TRANSMISSION CONTROL METHOD USING THE SAME

BACKGROUND

1. Field of the Invention

The present invention relates to a transmission control apparatus for a belt type mild hybrid vehicle and a transmission control method using the same, and more particularly, to a transmission control apparatus for a belt type mild hybrid vehicle which reduces a shift shock that can occur in shifting of the belt type mild hybrid vehicle and controls a torque of a motor generator so as to reduce a shift time, and a transmission control method using the same.

2. Discussion of Related Art

In recent years, demands for hybrid vehicles have been increasing, and accordingly, the development of technologies applied to the hybrid vehicles have been accelerating. In particular, in a case of a mild hybrid vehicle among the hybrid vehicles, an internal combustion engine is mainly used and an electric motor is used so as to assist the internal combustion engine to thereby increase efficiency of the internal combustion engine, and therefore inexpensive development costs and low price can be achieved.

In addition, among types of the mild hybrid vehicle, there is a type in which a motor generator and an engine are interworked by a belt and the motor generator compensates for a torque of a driving shaft connected to a transmission, thereby increasing efficiency of operation of the vehicle.

Meanwhile, as a transmission applied to a vehicle, a stepped transmission in which each stage is determined excluding a Continuously Variable Transmission (CVT) is generally used.

In this manner, in the stepped transmission, in order to shift the stepped transmission to a shifting stage having a different gear ratio, a power interruption or sleep interval of a driving shaft that is a driving force input stage of the transmission and a non-driving shaft that is a driving force output stage thereof may occur.

When the driving force is maintained as is in such a power interruption or sleep interval, a momentary load is disappeared, and therefore an increase in the speed may occur, and when shifting is performed and the driving shaft and the non-driving shaft are synchronized, a larger shift shock may occur.

In addition, when motoring is maintained as is in a case in which shifting is performed at an interval in which the motor generator performs the monitoring for driving force assistance in a hybrid system, there are problems such that a shift shock becomes larger, and speeds of the driving shaft and the non-driving shaft are synchronized so that a time for which shifting is completed is increased.

In addition, in a regenerative braking interval in which the motor generator is operated in the form of a generator, power input shafts of the driving shaft and the non-driving shaft are reversed, and even in a case in which momentary shafting is performed at the moment when a power generation torque for performing power generation in the same manner is generated, there are same problems such that a shift shock becomes larger by the generation torque and a time for which the shifting is completed is increased.

Therefore, there are demands for a method of solving the above-described problems.

PRIOR-ART DOCUMENT

Patent Document (Patent document 1) Korean Patent Laid-open Publication No. 10-0736685

SUMMARY OF THE INVENTION

The present invention is directed to a transmission control apparatus for a belt type mild hybrid vehicle and a transmission control method using the same, which may relieve a shift shock through torque control of a motor generator at the time of shifting and reduce a time for which shifting is completed.

According to an aspect of the present invention, there is provided a transmission control method for a belt type mild hybrid vehicle, including: collecting, by an integrated control unit, shifting information; setting, by the integrated control unit, a target torque of a motor generator in accordance with the shifting information; and controlling, by a motor control unit, the motor generator.

Here, between the setting of the target torque and the controlling of the motor generator, the transmission control method may further include determining whether shifting of the vehicle is performed in accordance with the shifting information.

Also, when it is determined in the determining that the shifting of the vehicle is not performed, the controlling of the motor generator may include controlling, by the motor control unit, the motor generator in accordance with the set target torque.

Also, when it is determined in the determining that the shifting of the vehicle is performed, the transmission control method may further include determining whether a driving shaft of the vehicle is driven.

Also, when it is determined in the determining that the driving shaft of the vehicle is driven, the transmission control method may further include re-setting a target torque upper limit value of the motor generator as a negative number.

Also, when it is determined in the determining that the driving shaft of the vehicle is not driven, the transmission control method may further include determining whether regenerative braking of the vehicle is performed.

Also, when it is determined in the determining that the regenerative braking of the vehicle is performed, the transmission control method may further include re-setting a target torque lower limit value of the motor generator as a positive number.

Also, when it is determined in the determining that the regenerative braking of the vehicle is not performed, the controlling of the motor generator may include controlling, by the motor control unit, the motor generator in accordance with the re-set target torque.

Also, the collecting of the shifting information may include receiving target shifting stage number information and current stage number information from a transmission control unit.

Also, the collecting of the shifting information may include receiving drive request torque information and regeneration request torque information from an engine control unit.

According to another aspect of the present invention, there is provided a transmission control apparatus for a belt type mild hybrid vehicle, including: a motor generator that is interworked with an engine and a belt; an integrated control unit that collects shifting information and sets a target torque of the motor generator in accordance with the shifting information; and a motor control unit that controls the motor generator in accordance with the target torque set by the integrated control unit.

Here, the transmission control apparatus may further include a transmission control unit that delivers target shifting stage number information and current stage number information to the integrated control unit.

Also, the transmission control apparatus may further include an engine control unit that delivers drive request torque information and regeneration request torque information to the integrated control unit.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a transmission control apparatus for a belt type mild hybrid vehicle according to an exemplary embodiment of the present invention and a transmission control method using the same will be described in detail with the accompanying drawings.

Figure 1:
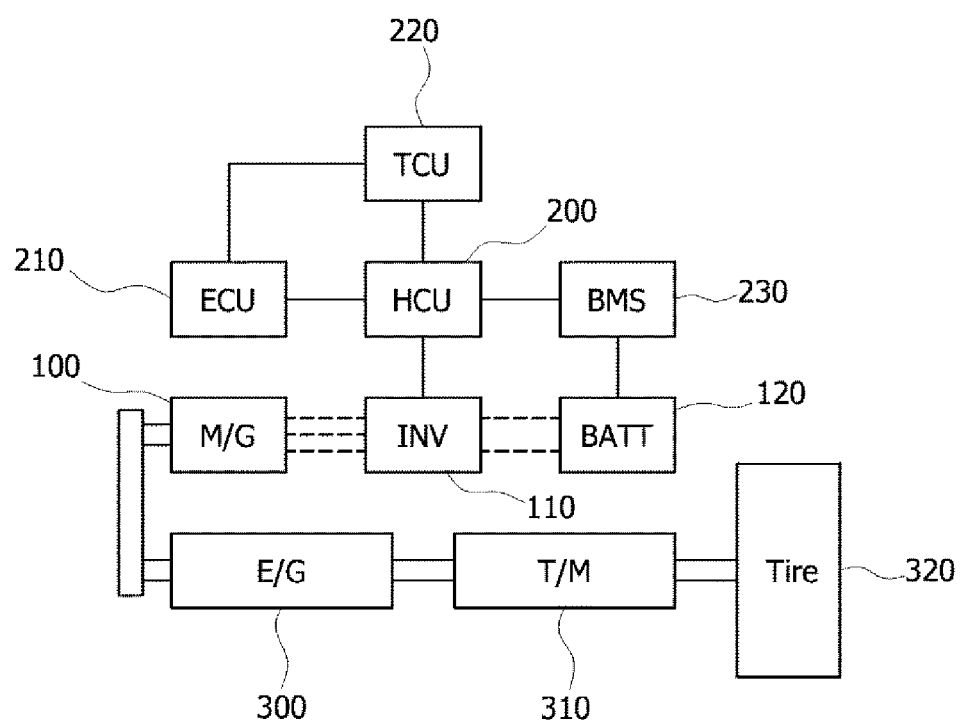
FIG. 1 is a block diagram illustrating each component of a transmission control apparatus for a belt type mild hybrid vehicle according to an exemplary embodiment of the present invention.

FIG. 1 is a block diagram illustrating each component of a transmission control apparatus for a belt type mild hybrid vehicle according to an exemplary embodiment of the present invention.

As illustrated in FIG. 1, the transmission control apparatus for the belt type mild hybrid vehicle according to an exemplary embodiment of the present invention includes a motor generator 100, an integrated control unit 200, and a motor control unit 110. In addition, according to the present embodiment, the transmission control apparatus may further include a transmission control unit 220 and an engine control unit 210.

The motor generator 100 may be interworked with an engine 300 by a belt to be used when starting the engine 300, and achieve functions such as a function of performing continuous power generation like an alternator, a regenerative braking function of recovering braking energy into electrical energy in a braking situation, a torque assistance function of assisting a torque of a driving shaft when starting a vehicle or when requiring a driving torque, and the like.

The integrated control unit 200 may integrally control the motor control unit 110 for controlling the motor generator 100, the engine control unit 210 for controlling the engine 300, the transmission control unit 220 for controlling a transmission 310 connected with wheels and tires 320, a battery control unit 230 for controlling a battery 120, and the like, collect shifting information from specific components, and set a target torque of the motor generator in accordance with the shifting information.

The motor control unit 110 is a component that controls the motor generator 100 in accordance with the target torque set by the integrated control unit 200.

The transmission control unit 220 is a component that delivers target shifting stage number information and current stage number information to the integrated control unit 200, and the engine control unit 210 is a component that delivers drive request torque information and regeneration request torque information to the integrated control unit 200.

That is, the integrated control unit 200 may calculate the target torque of the motor generator 100 based on the above-described information.

Hereinafter, the transmission control method for the belt type mild hybrid vehicle will be described in detail.

Figure 2:
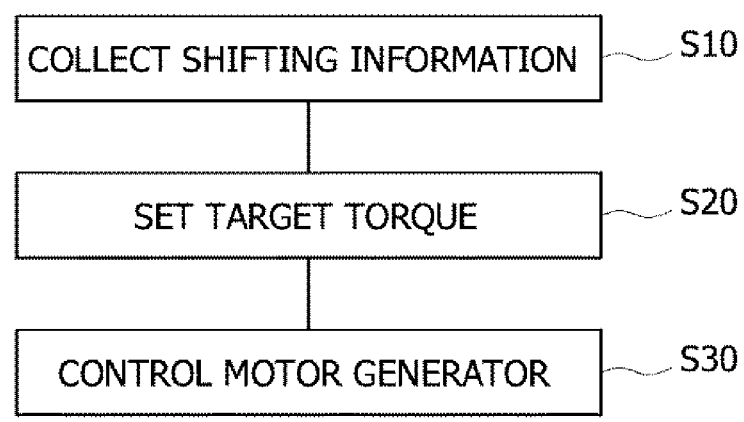
FIG. 2 is a flowchart illustrating each step of a transmission control method for a belt type mild hybrid vehicle according to an exemplary embodiment of the present invention.

FIG. 2 is a flowchart illustrating each step of a transmission control method for a belt type mild hybrid vehicle according to an exemplary embodiment of the present invention.

As shown in FIG. 2, the transmission control method for the belt type mild hybrid vehicle includes a step S 10 of collecting, by the integrated control unit, shifting information, a step of setting, by the integrated control unit, a target torque of the motor generator in accordance with the shifting information, and a step of controlling, by the motor control unit, the motor generator.

Detailed steps other than these steps may be further included in the transmission control method, which will be described with reference to FIG. 3.

Figure 3:
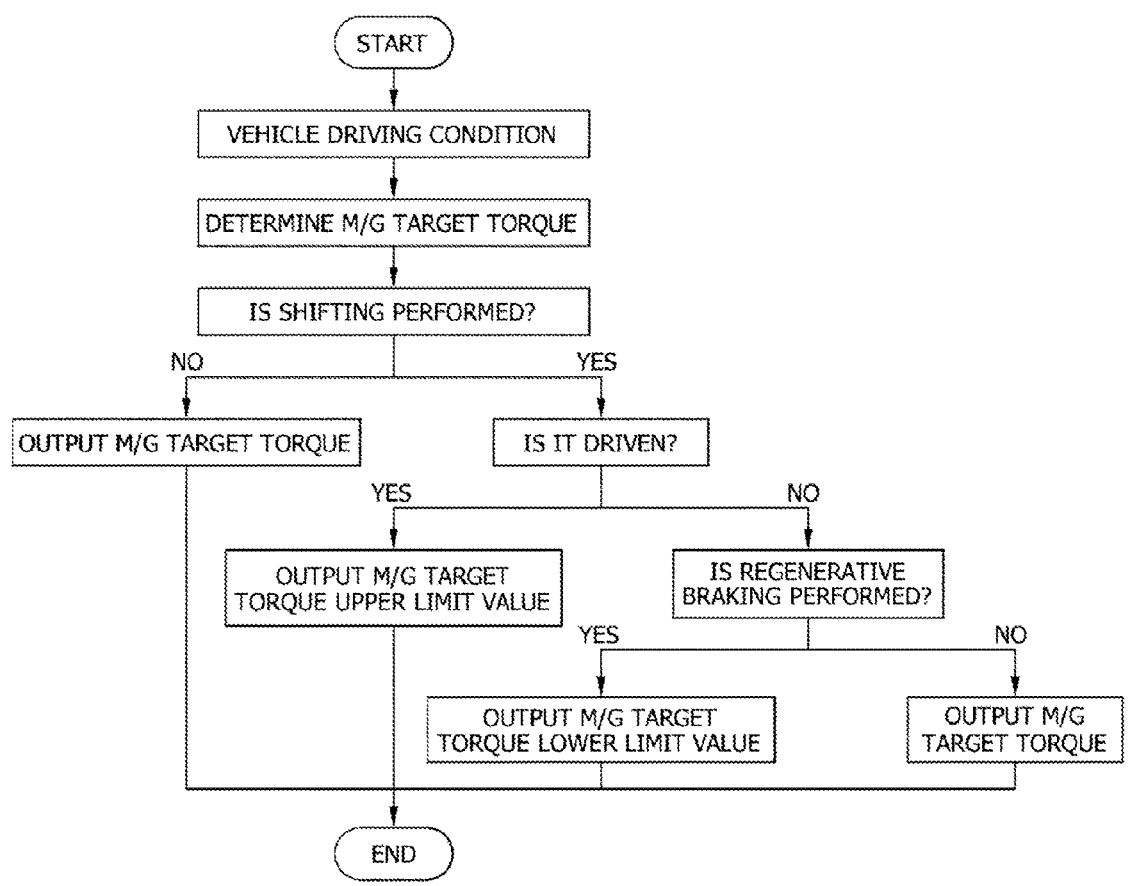
FIG. 3 is a flowchart illustrating a process of sequentially performing a transmission control method for a belt type mild hybrid vehicle according to an exemplary embodiment of the present invention.

FIG. 3 is a flowchart illustrating a process of sequentially performing a transmission control method for a belt type mild hybrid vehicle according to an exemplary embodiment of the present invention.

First, the integrated control unit determines the target torque of the motor generator during operation of a vehicle. That is, as described above, the step of collecting, by the integrated control unit, the shifting information, the step of setting, by the integrated control unit, the target torque of the motor generator in accordance with the shifting information are sequentially performed.

In this state, a step of determining whether shifting of the vehicle is performed in accordance with the shifting information is performed. Thus, in this step, the integrated control unit receives target shifting stage number information and current stage number information from the transmission control unit to thereby determine whether shifting of the vehicle is performed.

When it is determined that shifting of the vehicle is not performed based on the determination result, the step of controlling the motor generator is performed. In this step, the motor control unit controls the motor generator in accordance with the target torque set by the integrated control unit.

When it is determined that shifting of the vehicle is performed based on the determination result, a step of determining whether a driving shaft of the vehicle is driven is further performed before performing the step of controlling the motor generator. Thus, in this step, the integrated control unit receives drive request torque information from the engine control unit to thereby determine whether the driving shaft is driven.

When it is determined that the driving shaft of the vehicle is driven based on the determination result, a step of re-setting a target torque upper limit value of the motor generator as a negative number is performed. The reason in which this step is performed is because, in a case in which the driving shaft is driven, a driving shaft torque becomes larger than a non-driving shaft torque while shifting is performed. That is, the step of re-setting the target torque upper limit value is to reduce the driving shaft torque using the motor generator.

Next, in accordance with the re-set target torque, the step of controlling the motor generator is performed, and in this step, the motor control unit controls the motor generator in accordance with the target torque re-set by the integrated control unit.

However, when it is determined that the driving shaft of the vehicle is not driven, a step of determining whether regenerative braking of the vehicle is performed is further performed. In this step, the integrated control unit receives regeneration request torque information from the engine control unit to thereby determine whether regenerative braking of the vehicle is performed.

When it is determined that regenerative braking of the vehicle is performed based on the determination result, a step of re-setting a target torque lower limit value as a positive number is performed. The reason in which this step is performed is because, in a case in which regenerative braking of the vehicle is performed, the driving shaft torque becomes smaller than the non-driving shaft torque while shifting is performed. That is, the step of re-setting the target torque lower limit value is to increase the driving shaft torque using the motor generator.

Next, in accordance with the re-set target torque, the step of controlling the motor generator is performed, and in this step, the motor control unit controls the motor generator in accordance with the target torque re-set by the integrated control unit.

However, when it is determined that regenerative braking of the vehicle is not performed, the step of controlling the motor generator includes a step of controlling, by the motor control unit, the motor generator in accordance with an initially set target torque.

As described above, in the transmission control apparatus for the belt type mild hybrid vehicle and the transmission control method using the same according to the embodiments of the present invention, when shifting is performed at an interval in which a torque is generated as a negative or positive number in order for the motor generator to perform torque assistance or regenerative power generation, a shifting time may be known in advance using shifting advance information before performing shifting, a shift shock may be relieved through torque control of the motor generator at the time of shifting, and a time for which shifting is completed may be reduced.

In addition, even in an interval in which the motor generator does not perform torque assistance or regenerative power generation, a shift shock may be relieved using shifting advance information in the same manner, and a time for which shifting is completed may be reduced. As a result, it is possible to improve ride comfort in accordance with relief of the shift shock.

In addition, by reducing a speed difference and a torque difference between the driving shaft and the output shaft, a time and amount in which sleep occurs may be reduced, thereby increasing the durability of the transmission.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A transmission control method for a belt type mild hybrid vehicle, comprising:
   collecting, by an integrated control unit, shifting information; wherein the collecting of the shifting information includes receiving target shifting stage number information and current stage number information from a transmission control unit;
   setting, by the integrated control unit, a target torque of a motor generator in accordance with the shifting information;
   determining whether shifting of the vehicle is being performed, based on the shifting information; and
   controlling, by a motor control unit, the motor generator, wherein the controlling of the motor generator comprises:
   controlling, by the motor control unit, the motor generator in accordance with the set target torque when it is determined that the shifting of the vehicle is not being performed;
   determining whether a driving shaft of the vehicle is being driven when it is determined that the shifting of the vehicle is being performed; and
   re-setting a target torque upper limit value of the motor generator as a negative number when it is determined that the driving shaft of the vehicle is being driven.

2. The transmission control method of claim 1, wherein the controlling of the motor generator further comprises:
   determining whether regenerative braking of the vehicle is being performed when it is determined that the driving shaft of the vehicle is not being driven.

3. The transmission control method of claim 2, wherein the controlling of the motor generator further comprises:
   re-setting a target torque lower limit value of the motor generator as a positive number when it is determined that the regenerative braking of the vehicle is being performed.

4. The transmission control method of claim 2, wherein the controlling of the motor generator further comprises:
   when it is determined that the regenerative braking of the vehicle is not performed, the controlling of the motor generator includes controlling, by the motor control unit, the motor generator in accordance with a re-set target torque.

5. The transmission control method of claim 1, wherein the collecting of the shifting information includes receiving drive request torque information and regeneration request torque information from an engine control unit.

6. A transmission control apparatus for a belt type mild hybrid vehicle, comprising:
   a motor generator that is interworked with an engine and a belt;
   an integrated control unit that collects shifting information and sets a target torque of the motor generator in accordance with the shifting information;
   a transmission control unit for delivering target shifting stage number information and current stage number information to the integrated control unit; and a motor control unit that controls the motor generator in accordance with the target torque set by the integrated control unit, wherein the integrated control unit determines whether shifting of the vehicle is being performed, based on the shifting information, wherein the motor control unit controls the motor generator in accordance with the target torque set by the integrated control unit when the integrated control unit determines that the shifting is not being performed, wherein the integrated control unit determines whether a driving shaft of the vehicle is being driven when the integrated control unit determines that the shifting is being performed, and wherein the integrated control unit sets a target torque upper limit of the motor generator as a negative number when the integrated control unit determines that the driving shaft of the vehicle is being driven.

7. The transmission control apparatus of claim 6, further comprising:
an engine control unit that delivers drive request torque information and regeneration request torque information to the integrated control unit.

8. The transmission control apparatus of claim 6, wherein the integrated control unit is further configured to:
determine whether a regenerative braking of the vehicle is performed when the integrated control unit determines that the driving shaft of the vehicle is not being driven.

9. The transmission control apparatus of claim 8, wherein the integrated control unit is further configured to:
re-set a target torque lower limit value of the motor generator as a positive number when the integrated control unit determines that the regenerative braking of the vehicle is being performed.

* * * * *